Feb. 20, 1934.  F. KUEPPERS  1,948,039
AUTOMATIC SHUTTER SIGNAL FOR CAMERAS
Filed March 24, 1933
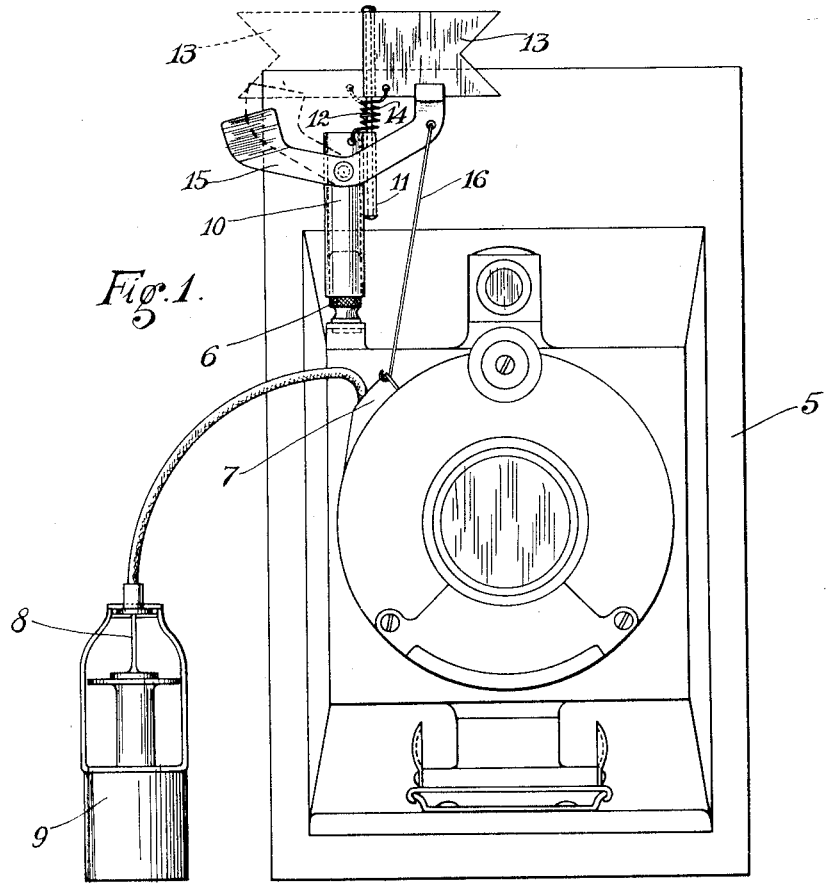
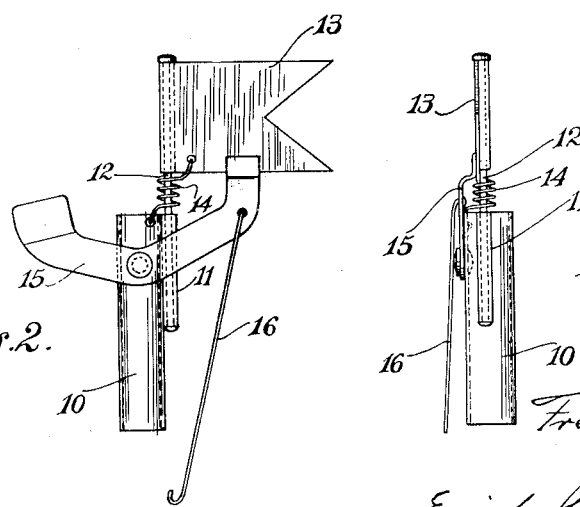
Fred Kueppers
INVENTOR
BY Erich H. Michaelis
ATTORNEY Patented Feb. 20, 1934

1,948,039

UNITED STATES PATENT OFFICE 1,948,039

AUTOMATIC SHUTTER SIGNAL FOR CAMERAS

Fred Kueppers, Chicago, Ill.

Application March 24, 1933. Serial No. 662,625

4 Claims. (Cl. 95—53)

The invention relates to signals and more especially to signals adapted to be used in connection with a photographic camera.

There are well known devices on the market which make it possible for a person taking a so-called snapshot to occupy a place before the camera, so that his own picture will be taken when the shutter of the camera is actuated. These devices may be adjusted to work slowly or fast, just as desired and are adapted to be attached to the plunger, which is usually operated by hand to actuate the shutter. When one of the above mentioned devices is used to operate the camera it happens frequently, that the persons to be photographed do not know if the picture has been taken or not, and that in consequence one or the other person standing before the camera will move just at the time when the film or the plate is being exposed, so that the picture will be spoiled.

The object of the invention therefore is to provide a signal, which will be actuated at the very time when the automatic device will actuate the shutter.

Another object of the invention is to actuate the signal device by means which form a standard part of a camera equipped to take so-called snapshots.

Other objects of the invention not specifically mentioned may be easily ascertained and understood from the following description in connection with the accompanying drawing forming a part thereof. It is however to be understood, that the invention is not to be limited or restricted to the exact construction and formation shown in the drawing and described in the specification, but that said invention is only to be limited by the scope of the claims appended hereto.

In the drawing illustrating a preferred embodiment of the invention.

Fig. 1 is a front view of a camera of a well known make equipped with an automatic device for actuating the shutter, and with a signal for indicating when the shutter is actuated by the automatic device.

Fig. 2 is a detail view of the signal according to the present invention, and

Fig. 3 is a side view of Fig. 2.

On each camera 5 a knurled knob 6 is provided and a lever 7, which is pushed in counterclockwise direction when the shutter (not shown) of the camera is to be operated. This operation is executed by hand by pushing the plunger 8 forming a standard part of the equipment of the camera towards the camera, that is upwardly in Fig. 1.

When the person taking the picture desires to be in the picture to be taken, an automatic device 9 is attached to the plunger 8, which will function slowly or fast just as desired. This device does not form a part of the present invention, but is well known, and is therefore not described or shown in detail. In order to indicate when the shutter of the camera is actuated by the automatic device 9, a signal is removably attached to the camera. This signal may be fastened to the camera in any desired manner, but preferably a hollow standard 10 is formed, which is adapted to be pushed over the knurled knob 6. On said sleeve a tube 11 of small diameter is fastened, and in said tube a rod 12 is rotatably inserted. On the upper end of said rod a plate 13 having for instance the shape of a flag or a pennant, is rigidly fastened, and a coil spring 14 is fastened with one of its ends to the sleeve 10 and with the other end to the plate 13. A two-armed lever 15 is pivotally mounted on the sleeve 10. A wire 16, or the like is fastened with one of its ends to one arm of the lever 15, and with the other end to the actuating lever 7 of the camera.

When a picture is to be taken and an automatic actuating device is to be used, the signal is attached to the camera by slipping the sleeve 10 over the knurled knob 6, and by attaching the wire 16 to the actuating lever 7. When the signal is in this position, the plate 13 will be pivoted about the axis of the rod 12 until it comes into the position, shown in Fig. 1 in full lines. The right hand end of the lever 15 engages then the plate and prevents a rotary movement of said plate under the pressure of the spring 14, which urges the plate to swing into the position, shown in Fig. 1 in dotted lines. When the automatic actuating device 9 works, it will cause the actuating lever 7 to move in counterclockwise direction, whereby the wire 16 is pulled downwardly in Fig. 1, removing the right hand arm of the lever 15 out of engagement with the plate 13. The plate will then be rotated by the pressure of the spring 14 into the position, shown in dotted lines in Fig. 1. Through the pivotal movement of the lever 15, the left hand arm of said lever will be moved upwardly in Fig. 1 so, that the outer end of said arm will be located in the path of movement of the plate 13, serving as a stop and holding the signal plate in the position shown in dotted lines in Fig. 1.

Having described my invention and how the same is to be performed, I claim as new and desire to secure by Letters Patent:

1. In a device of the class described a signal plate, a shaft, said plate being rigidly fastened to said shaft, means for attaching said shaft to the camera, said shaft being movably mounted on said means, an actuating lever on the camera and means for moving said plate when the actuating lever is being operated.

2. In a device of the class described a signal plate, a shaft, said signal plate being rigidly fastened to said shaft, a camera, the shaft being movably attached to said camera, a spring urging the signal plate into a certain direction, a lever pivotally fastened to said camera and adapted to be positioned in the path of movement of the signal plate preventing the plate to move under the pressure of the spring, an actuating lever on the camera, and a connecting member between said actuating lever and the first mentioned lever to remove said lever out of engagement with the signal plate, when the actuating lever is being operated.

3. In a signal device of the class described a camera, a signal plate, movably attached to said camera, a spring urging the plate into a certain direction, a two-armed lever pivotally mounted on said camera, one of the arms being adapted to engage the signal plate, thereby preventing movement of said plate, an actuating lever on said camera, a member connecting the actuating lever and the two-armed lever, and adapted to remove the above mentioned arm of the two-armed lever out of engagement with the signal plate and permitting movement of said plate under the pressure of the spring, and at the same time positioning the other arm of the two-armed lever into the path of the movement of the plate, and thereby stopping said movement.

4. In a device of the class described the combination of a camera having a shutter actuating lever, a signal plate movably attached to the camera, a two-armed lever pivotally connected with the camera, a member connecting the actuating lever and the two-armed lever, a spring urging the signal plate to move, one arm of the two-armed lever preventing such movement and being adapted to be pivoted by the connecting member, when the actuating lever is operated, so that the signal plate is released to move under the pressure of the spring.

FRED KUEPPERS.